United States Patent
Pathak

(10) Patent No.: US 9,836,585 B2
(45) Date of Patent: Dec. 5, 2017

(54) USER CENTRIC METHOD AND ADAPTOR FOR DIGITAL RIGHTS MANAGEMENT SYSTEM

(71) Applicant: Rabindra Pathak, San Jose, CA (US)

(72) Inventor: Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 314 days.

(21) Appl. No.: 13/843,973

(22) Filed: Mar. 15, 2013

(65) Prior Publication Data

US 2014/0282842 A1      Sep. 18, 2014

(51) Int. Cl.
*G06F 7/04*      (2006.01)
*G06F 21/10*     (2013.01)
*G06F 21/62*     (2013.01)

(52) U.S. Cl.
CPC .......... *G06F 21/10* (2013.01); *G06F 21/6218* (2013.01)

(58) Field of Classification Search
CPC ....... G06F 21/10; G06F 21/62; G06F 21/6218
USPC .......................................................... 726/1
See application file for complete search history.

(56) References Cited

U.S. PATENT DOCUMENTS

| | | | |
|---|---|---|---|
| 6,609,115 B1* | 8/2003 | Mehring ............. | G06F 21/6218 705/51 |
| 7,076,562 B2* | 7/2006 | Singhal .................... | H04L 67/20 709/232 |
| 8,032,921 B2* | 10/2011 | Takenaka et al. ................. | 726/1 |
| 8,429,721 B1* | 4/2013 | Tock ........................ | H04L 63/20 713/168 |
| 8,640,189 B1* | 1/2014 | Ernst .................... | H04L 63/0209 726/1 |
| 8,689,298 B2* | 4/2014 | Connor ................. | G06F 21/604 726/27 |
| 2004/0215980 A1* | 10/2004 | Hamid .......................... | 713/201 |
| 2005/0160428 A1* | 7/2005 | Ayachitula ............ | G06F 9/5016 718/104 |
| 2007/0050368 A1* | 3/2007 | Watanabe ........... | G06F 21/6218 |

(Continued)

FOREIGN PATENT DOCUMENTS

JP      2010-061300      3/2010

OTHER PUBLICATIONS

"Rights Management", Adobe Systems Incorporated, http://help.adobe.com/en_US/livecycle/10.0/Overview/WS92d06802c76abadb2c8525912ddcb9aad9-7ff8.html, 1 page, printed from the Internet on Mar. 14, 2013.

(Continued)

*Primary Examiner* — Hadi Armouche
*Assistant Examiner* — Abdullah Almamun
(74) *Attorney, Agent, or Firm* — Chen Yoshimura LLP

(57) ABSTRACT

A method for managing users' digital rights to documents protected by digital rights management (DRM), comprising the steps of a rights management system (RMS) server receiving a request from a user for accessing a DRM-protected document, and the RMS server executing a user centric adaptor (UCA) module to check in a UCA database under the user's identification (ID) whether one of a limited number of predetermined policies of digital rights is added to the user's ID, whereas if the user's rights to the document is not revoked by deletion of a predetermined policy under the user's ID in the UCA database, then the UCA module does not block granting the user's request.

20 Claims, 11 Drawing Sheets

(56) References Cited

U.S. PATENT DOCUMENTS

| | | | |
|---|---|---|---|
| 2007/0204324 A1* | 8/2007 | Roberts | G06F 21/31 |
| | | | 726/1 |
| 2008/0232703 A1* | 9/2008 | Hamada | H04N 1/32133 |
| | | | 382/232 |
| 2010/0162349 A1* | 6/2010 | Kawai | 726/1 |
| 2011/0019926 A1* | 1/2011 | Saito | G06K 9/2063 |
| | | | 382/218 |
| 2011/0197254 A1* | 8/2011 | Sallaka et al. | 726/1 |
| 2012/0117611 A1* | 5/2012 | Wookey | 726/1 |
| 2012/0166524 A1* | 6/2012 | Watakabe et al. | 709/203 |
| 2012/0246112 A1* | 9/2012 | Gonzalez | G06F 17/30174 |
| | | | 707/610 |
| 2012/0311672 A1 | 12/2012 | Connor et al. | |
| 2013/0115915 A1* | 5/2013 | Tipton et al. | 455/411 |

OTHER PUBLICATIONS

"Programmatically applying policies", Adobe Systems Incorporated, http://help.adobe.com/en_US/livecycle/10.0/Overview/WSb96e41f8a4ca47a9-4882aeb5131190eddba-8000.html, 1 page, printed from the Internet on Mar. 14, 2013.

"LiveCycle® ES Java™ API Reference", Adobe Systems Incorporated, http://livedocs.adobe.com/livecycle/es/sdkHelp/programmer/javadoc/index.html, 1 page, printed from the Internet on Mar. 14, 2013.

Adobe Systems Incorporated, "Adobe LiveCycle ES3 Overview: Rights Management", http://help.adobe.com/en_US/livecycle/10.0/Overview/WS92d06802c76abadb2c8525912ddcb9aad9-7ff8.html, 7 pages, printed from the Internet on Apr. 15, 2014.

EP Office Action, dated Aug. 4, 2016, in a counterpart EP patent application, No. 14151752.4.

Chinese Office Action, dated Jul. 6, 2016, in a counterpart Chinese patent application, No. CN 201410092415.6.

Japanese Office Action, dated May 31, 2016, in a counterpart Japanese patent application, No. JP 2014-008834.

Japanese Office Action, dated Jan. 24, 2017, in a counterpart Japanese patent application, No. JP 2014-008834.

Oral Proceedings in a corresponding application EP 14151752.4, dated May 3, 2017.

Chinese Office Action, dated Mar. 24, 2017, in a corresponding Chinese patent application, No. CN 201410092415.6.

Chinese Office Action, dated Sep. 28, 2017, in a corresponding Chinese patent application, No. CN 201410092415.6.

* cited by examiner

USER CENTRIC METHOD AND ADAPTOR FOR DIGITAL RIGHTS MANAGEMENT SYSTEM

BACKGROUND OF THE INVENTION

Field of the Invention

This invention relates to digital rights management (DRM) systems, and in particular, it relates to user access control method and module for DRM systems.

Description of Related Art

Documents traditionally available only in hard copies are increasingly also available in digital copies. In fact many documents nowadays are prepared, generated, stored, distributed, accessed, read or otherwise used electronically in digital file formats such as the Portable Document Format (PDF).

With the wide use of digital file formats in document processing, digital rights management (DRM) systems are increasing implemented to control user access and prevent unauthorized use of digital documents.

The rights involved in using a digital document may include the right to view (or "read") the digital document, the right to edit (or "write") the digital document, the right to print the digital document in hard copies, the right to copy the digital document, etc. A user may access a digital document by acquiring (or being assigned) one or more of these rights, and any of the acquired or assigned rights may be later revoked for various reasons.

DRM systems are generally implemented for managing users' rights to the digital documents stored in the systems. Current DRM systems are designed with a document centric rights management approach. The core design principle of such systems is that each digital document is associated with a single one of many "policies" which are centered around documents rather than users.

There is a need to provide a new approach for DRM systems that can be more flexible and adaptable to real life situations and needs in digital document access and usage by everyday users.

SUMMARY

Embodiments of the present invention provide a user centric method and module to DRM systems for managing digital rights based on a user centric approach.

Additional features and advantages of the invention will be set forth in the descriptions that follow and in part will be apparent from the description, or may be learned by practice of the invention.

The objectives and other advantages of the invention will be realized and attained by the structure particularly pointed out in the written description and claims thereof as well as the appended drawings.

To achieve these and/or other objects, as embodied and broadly described, one of the exemplary embodiments of the present invention provides a method for managing users' digital rights to documents protected by digital rights management (DRM), comprising the steps of a rights management system (RMS) server receiving a request from a user for accessing a DRM-protected document, and the RMS server executing a user centric adaptor (UCA) module to check in a UCA database under the user's identification (ID) whether one of a plurality of predetermined policies of digital rights is added to the user's ID for the document, wherein if none of the plurality of predetermined policy is added to the user's ID for the document in the UCA database, then the UCA module blocks granting the user's request.

In a further aspect, another one of the exemplary embodiments of the present invention provides a computer software program product that causes a data processing apparatus to perform the above described methods. The computer program product includes a computer usable non-transitory medium (e.g. memory or storage device) having a computer readable program code embedded therein for controlling a data processing apparatus, the computer readable program code configured to cause the data processing apparatus to execute the above described processes.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention are directed to a new DRM system and method centered around users rather than documents.

As mentioned earlier, existing DRM systems are designed with a document centric rights management approach which centers around documents rather than users, where one document is associated with one policy only.

Figure 1:
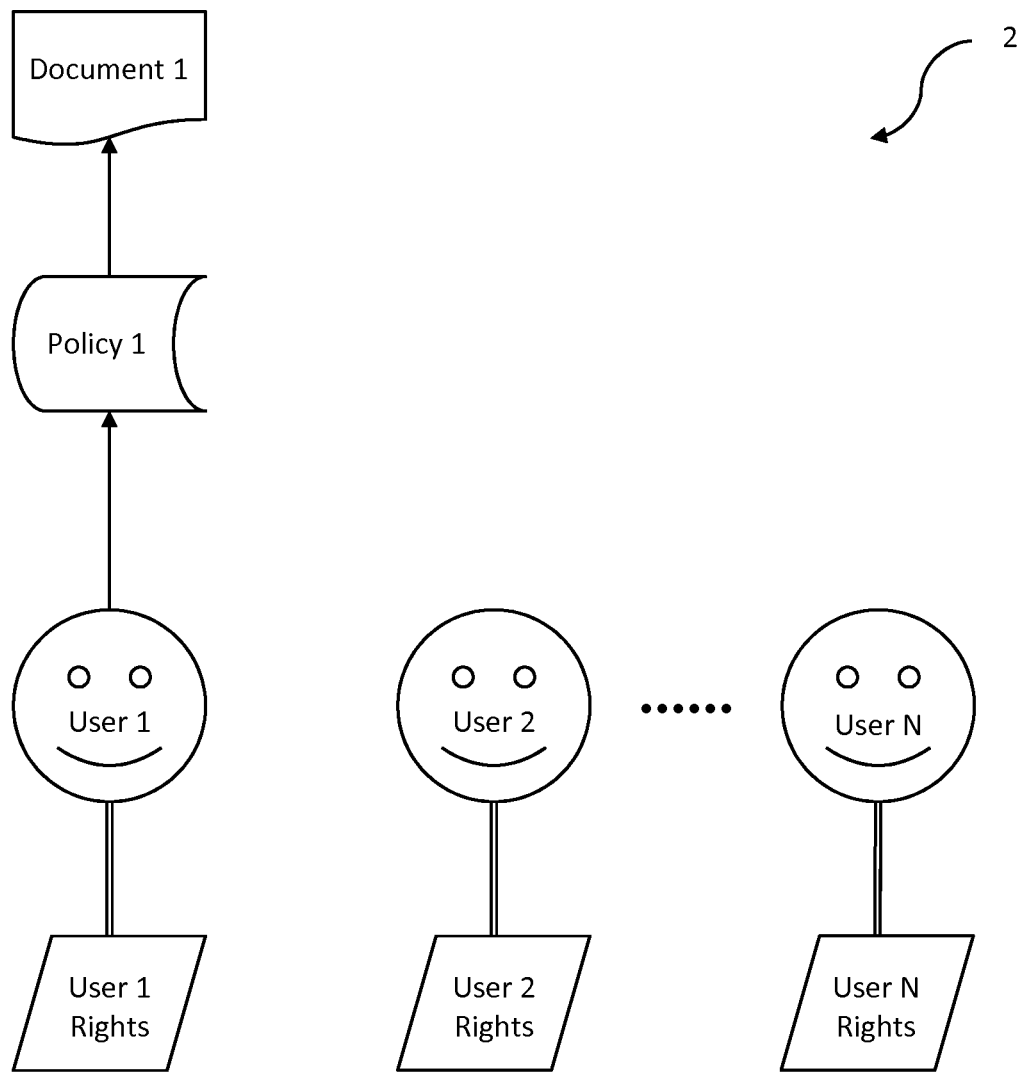
FIG. 1 is a schematic block diagram illustrating a document centric approach of an existing DRM system.

Referring to FIG. 1, there is shown a schematic block diagram illustrating a document centric approach of existing DRM systems. The description herein of the structures, functions, interfaces and other relevant features, such as digital rights policies, application programming interface (API) for rights management and policies, etc., of existing DRM systems may at times incorporates, references or otherwise uses certain information, documents and materials from publicly and readily available and accessible public information, e.g., "Rights Management" (URL http://help.adobe.com/en_US/livecycle/10.0/Overview/WS92d06802c76abadb2c8525912ddcb9a ad9-7ff8.html), "Programmatically applying policies (a subsection of 'Rights Management')", (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc.

In the document centric approach of existing DRM systems, Document 1 is associated with Policy 1 only. When User 1 acquires a set of rights (i.e., User 1 Rights), e.g. the right to view Document 1, then User 1 is added to Policy 1, and Policy 1 is added to Document 1 in a database.

Figure 2:
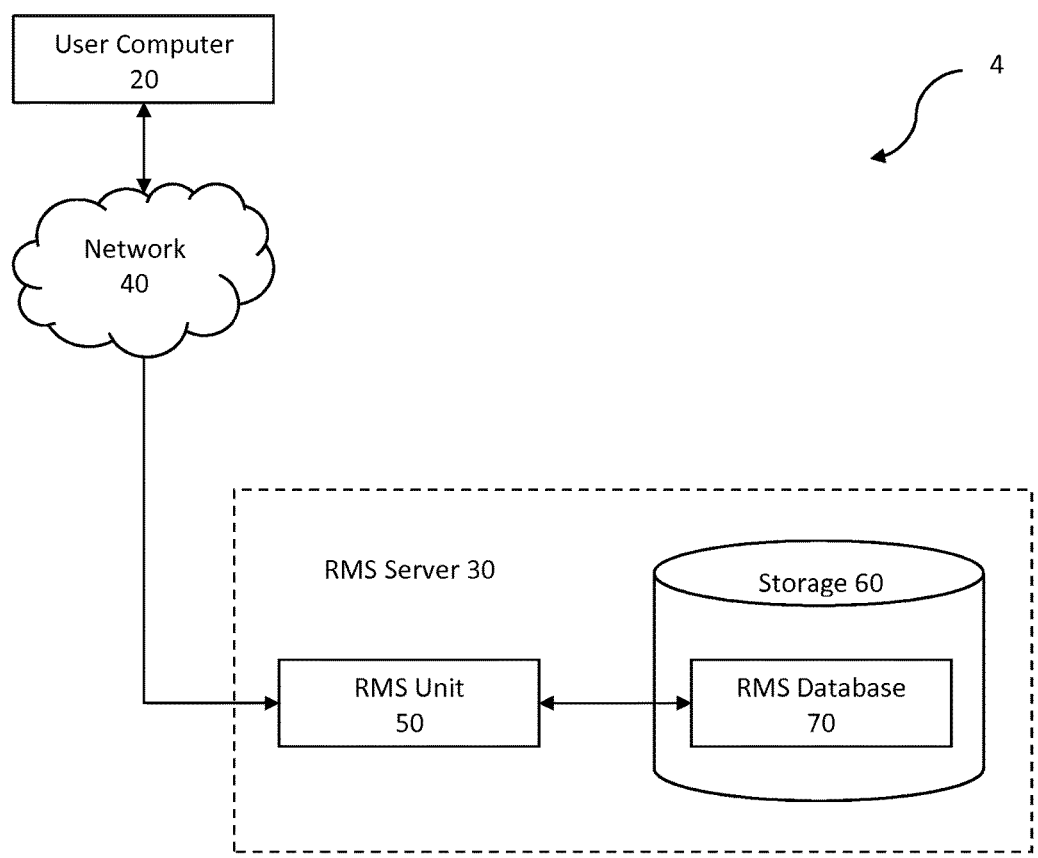
FIG. 2 is a schematic block diagram illustrating an online environment of an existing DRM system.

Referring to FIG. 2, there is shown at 2 a schematic block diagram illustrating an online environment of an existing DRM system. In this environment, a customer or user terminal 20 is connected to a rights management system (RMS) server 30 via a computer network 40 such as the Internet. The RMS server 40 typically includes component parts which form a unit (referred to as the "RMS unit" 50) that handles the DRM functions. The RMS server typically also includes an internal (or external) storage device 60 for storing digital documents managed by the RMS server. Also stored in the storage 60 is an RMS database 70 which includes index and tables of the documents, policies and users managed by the RMS server.

For example, for the situation shown in FIG. 1, a table (e.g., Table 1.1 below) may be stored in the database 70 of the RMS server 30 to indicate that Policy 1 (P1) is added to Document 1 (D1):

TABLE 1.1

| Document ID | Policy ID |
| --- | --- |
| D1 | P1 |

When User 1 (U1) with a right to view D1 is added to P1, another table (e.g., Table 2 below) may be stored in database 70 to indicate that U1 with a right to view is added to P1:

TABLE 2.1

| Policy ID | Rights | | | User ID |
| --- | --- | --- | --- | --- |
| | View | Print | Copy | |
| P1 | Yes | | | U1 |

When U1 acquires additional rights to additional documents, U1 will be added to the respective policies associated with the additional documents.

Figure 3:
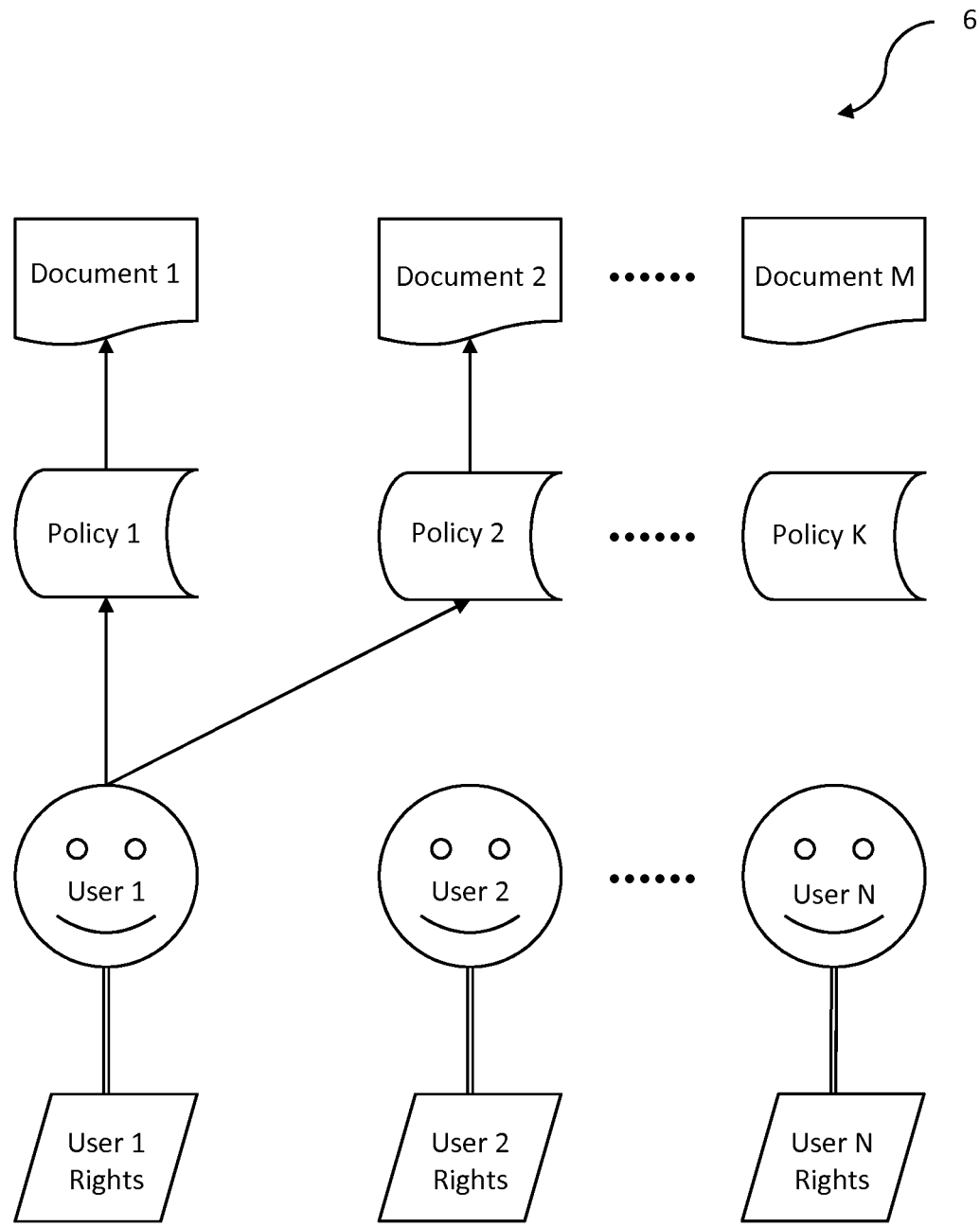
FIG. 3 is a schematic block diagram also illustrating a document centric approach of an existing DRM system.

For example, as shown in FIG. 3, when User 1 acquires the rights to print and copy Document 2, User 1 will be added to Policy 2 which is associated with Document 2. In this situation, the tables in the database will be updated as follows to indicate that U1 with rights to print and copy is added to Policy 2 (P2) and P2 is added to Document 2 (D2):

TABLE 1.2

| Document ID | Policy ID |
| --- | --- |
| D1 | P1 |
| D2 | P2 |

TABLE 2.2

| Policy ID | Rights | | | User ID |
| --- | --- | --- | --- | --- |
| | View | Print | Copy | |
| P1 | Yes | | | U1 |
| P2 | | Yes | Yes | U1 |

When additional users acquire their respective rights to the documents, the tables in the database will be updated with the additional users added to the additional policies associated with the additional documents.

Figure 4:
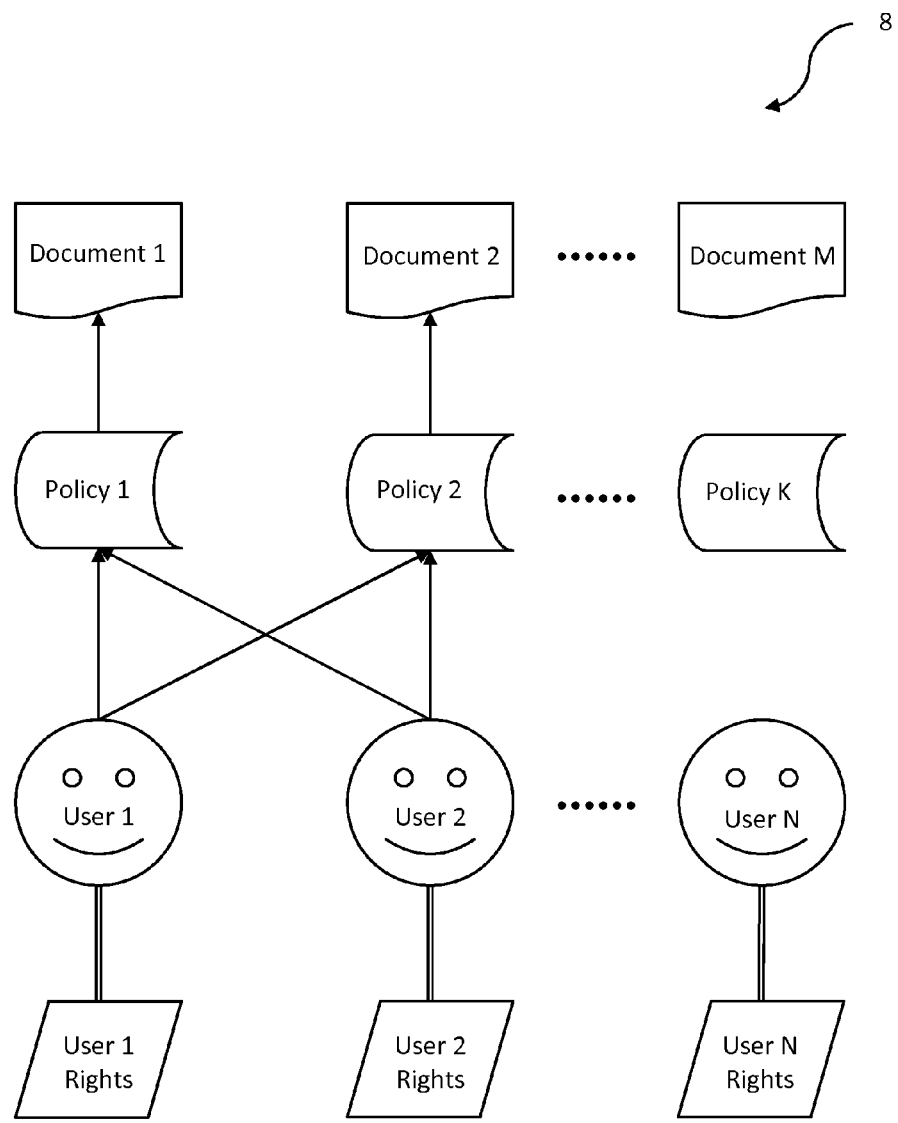
FIG. 4 is a schematic block diagram further illustrating a document centric approach of an existing DRM system.

For example, as shown in FIG. 4, when User 2 acquires the right to print Document 1 and the rights to view and copy Document 2, User 2 will be added to Policy 1 which is associated with Document 1 as well as Policy 2 which is associated with Document 2. In this situation, the tables in the database will be updated as follows to indicate that U2 with the right to print D1 is added to P1 and U2 with the rights to view and copy D2 is added to P2:

TABLE 2.2

| Policy ID | Rights | | | User ID |
| --- | --- | --- | --- | --- |
| | View | Print | Copy | |
| P1 | Yes | | | U1 |
| P1 | | Yes | | U2 |
| P2 | | Yes | Yes | U1 |
| P2 | Yes | | Yes | U2 |

While the above described document centric approach provides an environment that protects a DRM-protected document from unauthorized access based on the policy assigned to the document, it also results in a very large policy ID table in the database. As new users with different rights to different documents are added to the policies, the potential size of the policy ID table in the database (i.e., Table 1.3) can be very large. For example, if there are N users having various rights to M documents, then in a worst case scenario where each document has a different policy, i.e., the number (K) of policies is the same as the number (M) of documents, the policy ID table (Table 1.3) will have M×N rows. This may result in slow performance of the RMS server.

Moreover, the existing document centric approach also results in a very inflexible manner in handling real life scenarios. For example, if a same policy is assigned to several documents, then a user's rights to access one or only few of the documents cannot be revoked, which means that if a user's right to access one document needs to be revoked, then the user's rights to all documents that have the same policy assigned will be revoked as well, because revoking access to one document revokes access to all documents with same policy. This is not a desired result. In real life, this is a very common scenario. For example, a library can have lot of e-books with the same policy and a user loans few of these books. Later on the user decides to return one of the e-books and get a refund for some reason. However, revoking the user's right to that e-book will automatically revoke the user's rights to all of the e-books that user has loaned. This is a big limitation of the existing document centric approach.

In addition, as seen in FIG. 4, under the document centric approach, a document may be accessed by different users using the same policy. For example, as shown in FIG. 4, both Users 1 and 2 may access Document 1 using the same Policy 1. Since a same policy can be assigned to many documents, a user that is assigned to access one policy can get access to all documents with the same policy. In real life, the desired result would be that access to only selected documents is given to each user. Existing document centric approach cannot guarantee this restriction.

The embodiments of the present invention provide a user centric method and module to DRM systems for managing digital rights based on a user centric approach.

Figure 5:
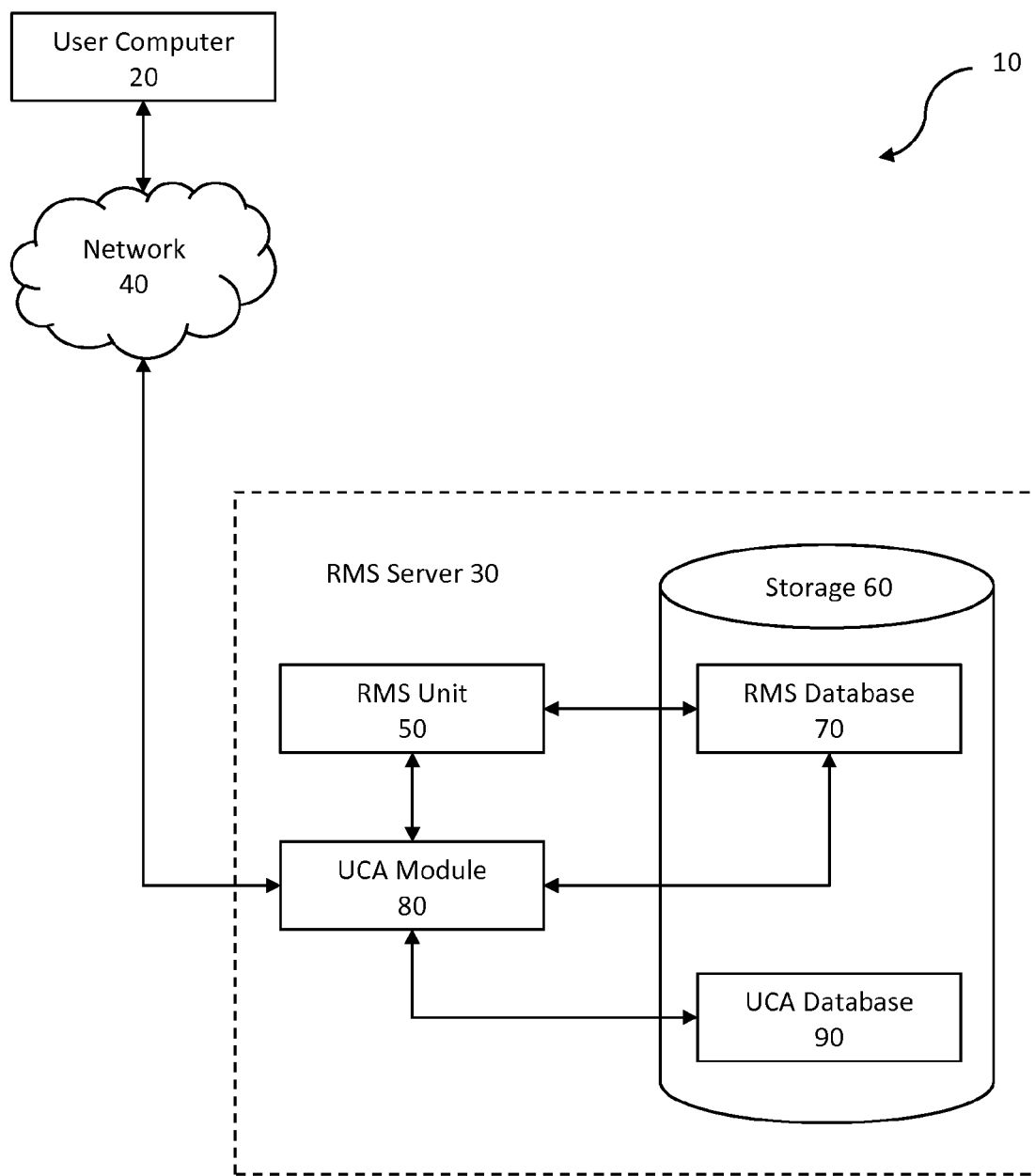
FIG. 5 is a schematic block diagram illustrating an exemplary online environment of a DRM system according to an embodiment of the present invention.
Figure 6:
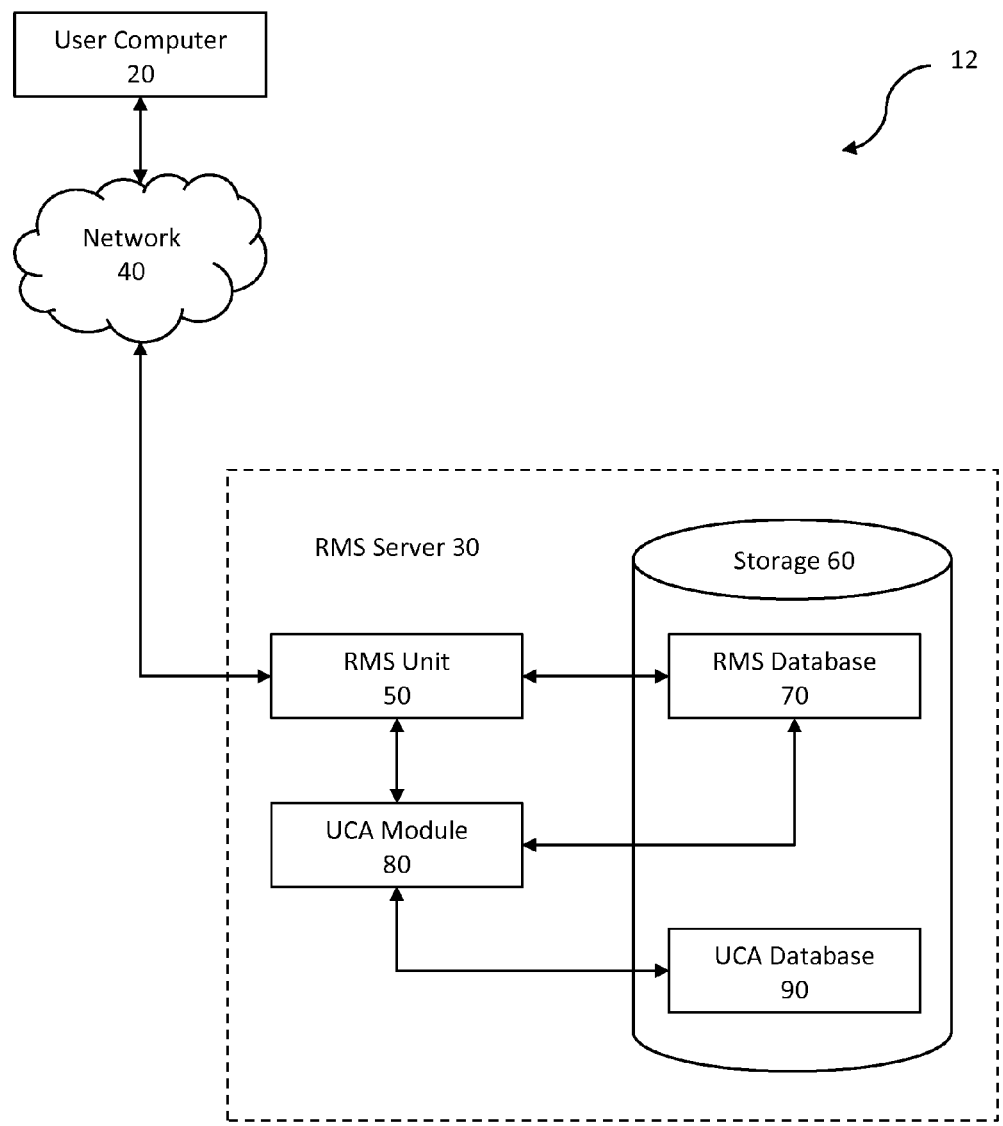
FIG. 6 is a schematic block diagram illustrating an exemplary online environment of an DRM system according to another embodiment of the present invention.

Referring to FIGS. 5 and 6, there is shown a schematic block diagram illustrating an exemplary arrangement 10 of a DRM system in which various embodiments of the present invention may be implemented. In this environment, a customer or user terminal 20 is connected to an RMS server 30 via a computer network 40 such as the Internet. The RMS server 40 has hardware and software component parts which form an RMS unit 50 that handles the DRM functions. The RMS server 40 also includes an internal (or external) storage device 60 for storing DRM-protected documents. Also stored in the storage 60 is an RMS database 70 which includes index and tables of the documents, policies and users managed by the RMS server 40.

According to the embodiments of the present invention, a user centric adaptor (UCA) module 80 is added to the RMA server 40. The UCA module 80 may be a hardware chip such as a read-only memory device that is embedded with computer codes and instructions executable by the RMS server, or a software plug-in to the RMS application programs stored on and executed by the RMS server. In any event, the UCA module 80 contains computer executable codes and instruction for performing the steps of the process according to embodiments of the present invention described herein. In addition, a UCA database 90 is also added and stored in the storage 60. The UCA database 90 is established by and for the UCA module 80 and is accessible and maintained/updated by the UCA module 80.

In the arrangement shown in FIG. 5, the UCA module 80 acts as the "gateway" of the RMS server for the proposes and processes described herein for the user centric approach of the DRM method and system according to embodiments of the present invention, whereas in the arrangement shown in FIG. 6, the RMS unit 50 acts as the "gateway" of the RMS server for the proposes and processes described herein for the user centric approach of the DRM method and system according to embodiments of the present invention. These arrangements will be described in detail below.

When computer network such as the Internet is utilized, a customer or user may use the user terminal or computer 20, or similar suitable devices such as a laptop computer, a tablet computer, an e-reader, or a smart phone, etc., to access the computer network 40 and interact with the RMS server 30, etc. An administrator or operator may operate the RMS server 30 to access the network 40 and interact with the customer or user through the user terminal 20, etc.

The RMS server 30 may be operated by, for example, a copyrights management center, a DRM service, an online content provider, an educational institution, etc., which generally provides online electronic documents, books, booklets, publications and other materials in digital files. The RMS server 30 may provide an integrated online service platform such as an online course or webstore that allows users to search, access, upload or download, and purchase electronic documents stored as digital files in its internal or external storage 60. When electronic documents are purchased or otherwise acquired by users in digital files, the RMS server 30 will enable appropriate DRM protection to the documents so that only the users who have appropriate rights to the documents may have rights to, e.g., view, print and/or copy the documents. These RMS functions are provided and performed by the RMS unit 50.

The computers (or terminals) and servers 20 and 30 may be computers, server computers, or computer or server systems, such as webservers, where the computer software program(s) and/or application(s) implementing the various processes of the exemplary embodiments of the present invention may be installed and executed.

Typically these computers and servers provide a user interface or graphic user interface to allow users or operators to interact with the computer software programs and applications to perform various steps of the process.

In this application the term "server" generally refers to any computer, server, server computer, server instance, computer or server system, data processor, controller, data processing unit or apparatus, or any suitable system, apparatus or device, and any computer software program or application that are installed or executed on such system, apparatus or device, that may be used to implement the methods or carry out the processes provided by the embodiments of the present invention.

A user typically accesses the computers and server by using computer programs or applications on the users' own computer or on a server that the user can access through a user computer or terminal.

In this application, unless otherwise specified, the term "user" may generally refer to anyone who uses the method or related apparatus provided by the embodiments of the present invention. In addition, the terms "user" and the computer or server used by the user may be used interchangeably respectively to refer to such person or entity who uses a server and/or a server that is used by such person or entity to carry out the steps of the process according to the various embodiments of the present invention.

The physical locations or the commercial relationship among the various parts of the environment shown in FIGS. 5 and 6 are not important. For example, the RMS server 30 may be located in an educational institution, an organization or a commercial establishment.

As mentioned earlier, in one aspect, an exemplary embodiment of the present invention is embodied a computer program product that causes a data processing apparatus to perform the exemplary embodiments of the methods of the present invention. The computer program product includes a computer usable non-transitory medium (e.g. memory or storage device) having a computer readable program code embedded therein for controlling a data processing apparatus, where the computer readable program code is configured to cause the data processing apparatus to execute the process of the present invention as shown in FIG. 7.

Figure 7:
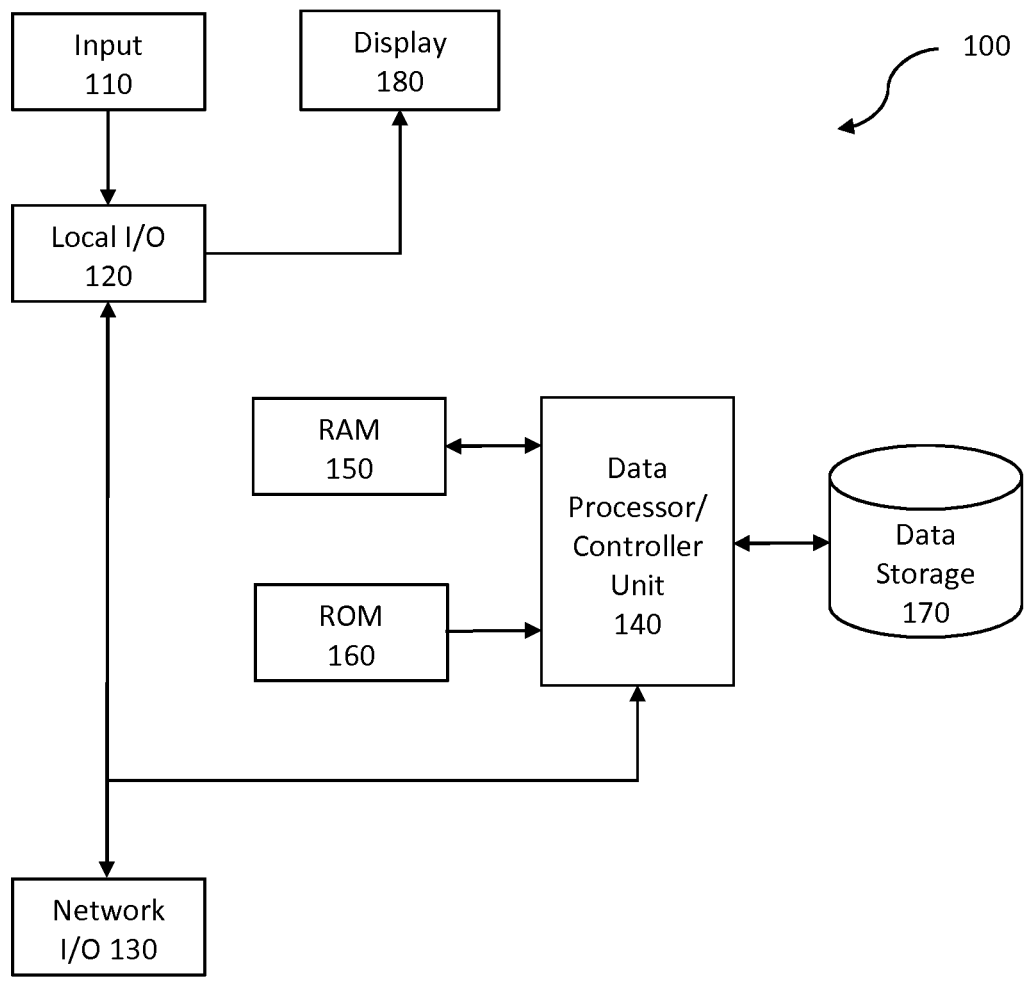
FIG. 7 is a schematic block diagram illustrating an exemplary data processing apparatus such as a computer or server having a data processing unit according to the embodiments of the present invention.

Referring to FIG. 7, there is shown a schematic block diagram illustrating an exemplary server 100, whereupon various embodiments of the present invention may be implemented. The server 100 typically includes a user input device 110 including, for example, a keyboard and a mouse. The input device 110 may be connected to the server 100 through a local input/output (I/O) port 120 to enable an operator and/or user to interact with the server 110. The local I/O 120 is also provided for local connections via direct links to other electronic devices such as a file storage, a monitor and/or a printer. The server 100 typically also has a network I/O port 130 for connection to a computer network such as the Internet, so that the server 100 may remotely communicate with the other servers connected to the computer network.

The server 100 typically has a data processor/controller unit 140 such as a central processor unit (CPU) that controls the functions and operations of the server 100. The data processor/controller unit 140 is connected to various memory devices such as a random access memory (RAM) device 150, a read only memory (ROM) device 160, and a storage device 170 such as a hard disc drive or solid state memory. The storage device 170 may be an internal memory device or an external memory device such as a file storage device.

The computer software program codes and instructions for implementing the various embodiments of the present invention may be installed or saved on one or more of these memory devices such as the ROM 160 or storage device 170. When executed, certain computer program codes and/or instructions may be read out from the ROM 160 or storage device 170 and temporarily stored in the RAM 150 for execution by the data processor/controller unit 140, which executes these computer programs codes and/or instructions to perform the functions and carry out the operations to implement the process steps of the various embodiments of the present invention.

The server 100 typically also includes a display device 180 such as a video monitor or display screen which may be connected to the local I/O 120. The input device 110 and the display device 180 together provide a user interface which allows a user to interact with the server 100 to perform the steps of the process according to the various embodiments of the present invention. The input device 110 and the display device 180 may be integrated into one unit, such as a touch screen display unit, to provide a more easy and convenient UI for user interaction with the server 100.

It is understood that the server 100 may be any suitable computer or computer system. Preferably for use as, for example, the RMS server 30, the server 100 is a commercial server. However, for use by a member of the general public, the server 100 may be a desktop computer, a laptop computer, a notebook computer, a netbook computer, a tablet computer, a hand-held portable computer or electronic device, a smart phone, or any suitable data processing apparatus that has suitable data processing capabilities.

Figure 8:
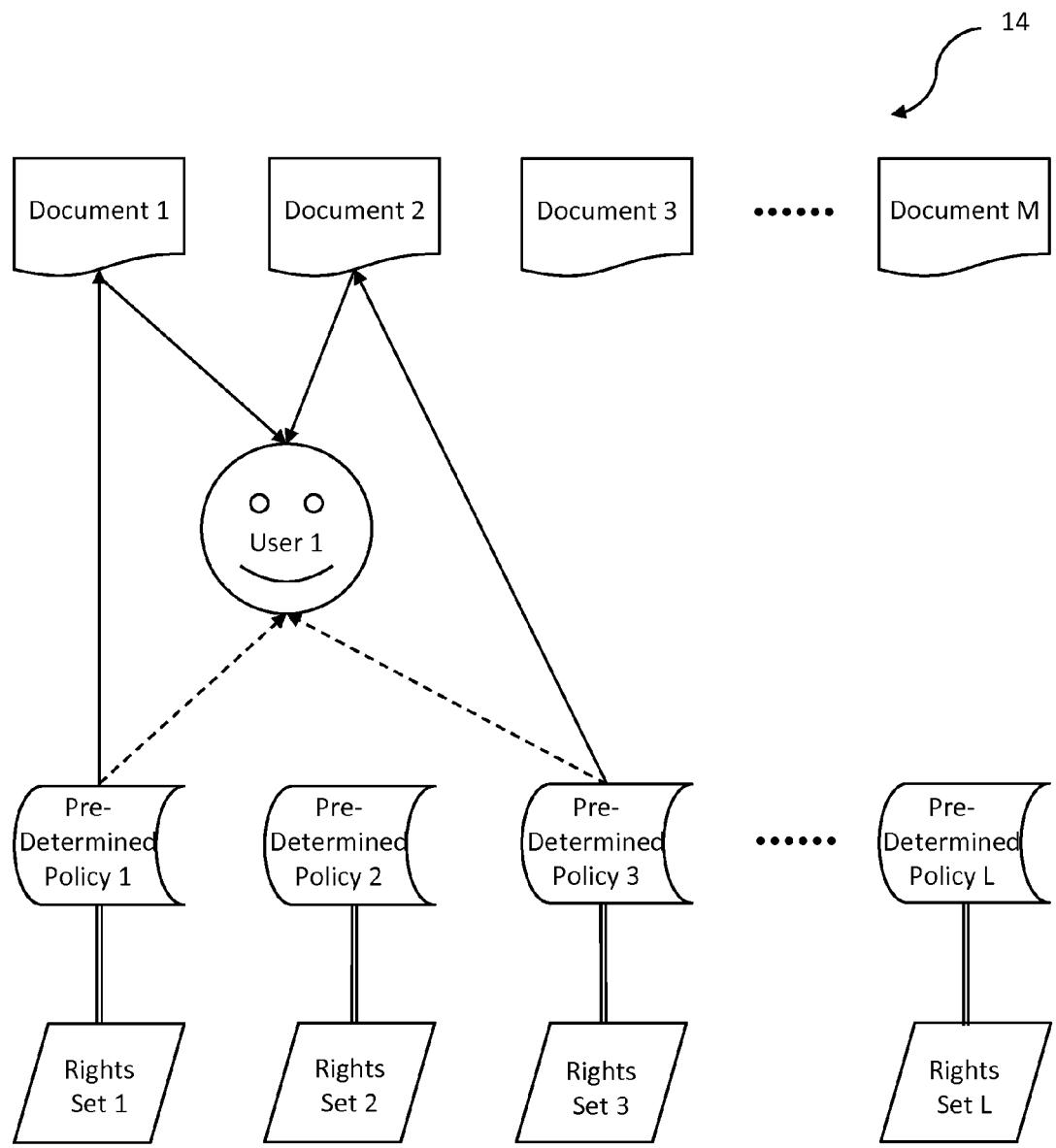
FIG. 8 is a schematic block diagram illustrating a user centric approach for a DRM system according to the embodiments of the present invention.
Figure 9:
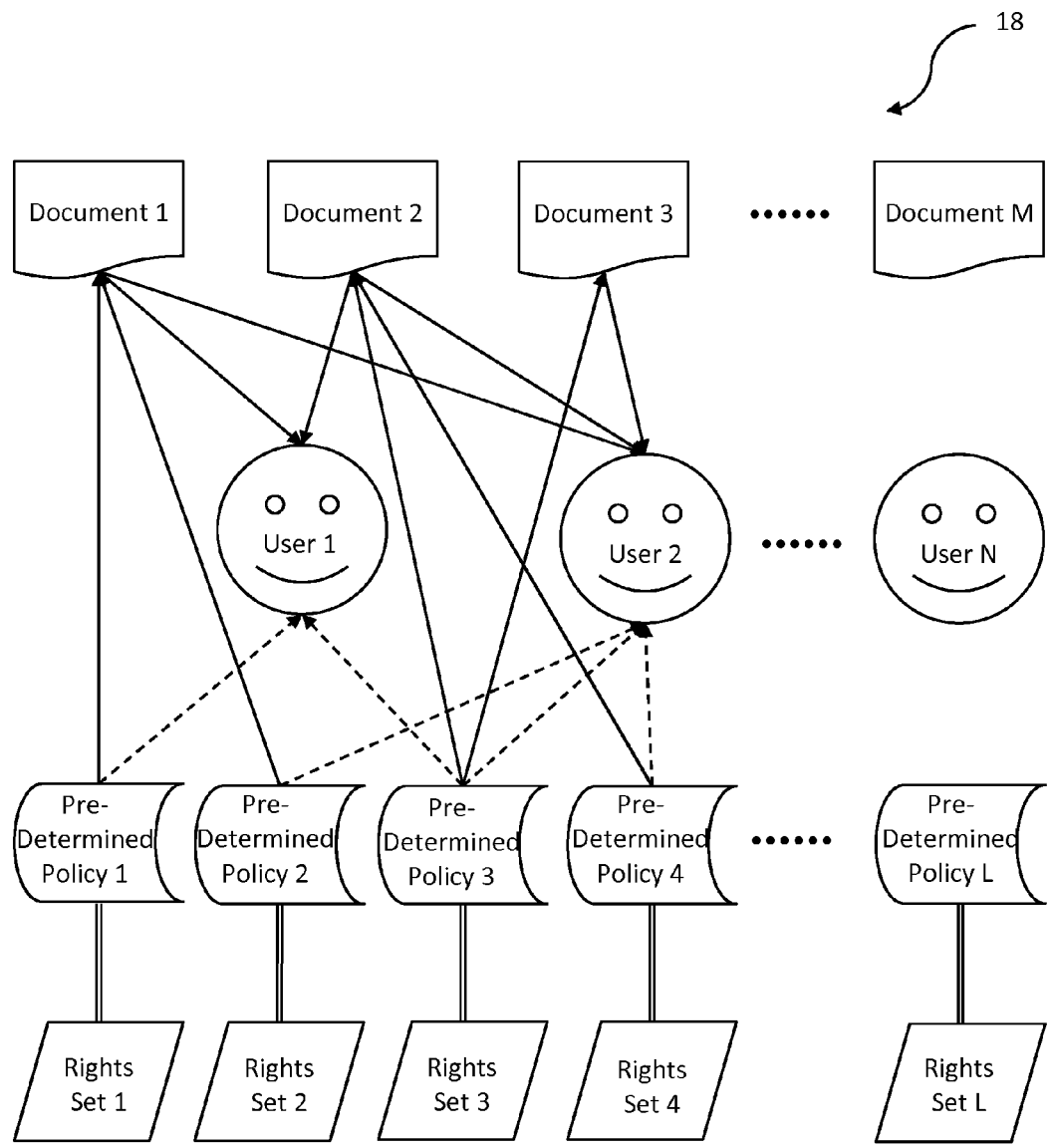
FIG. 9 is a schematic block diagram further illustrating a user centric approach for a DRM system according to the embodiments of the present invention.

Referring to FIGS. 8 and 9, there is shown a schematic block diagram illustrating a user centric approach for a DRM system according to the embodiments of the present invention.

According to the user centric approach in the embodiment reflecting one aspect of the present invention, each policy is associated with a fixed set of rights. For example, if there are three (3) digital rights for DRM-protected documents, i.e., view, print and copy, then there are only eight ($2^3=8$) possible combinations of such rights. In the embodiments of the present invention, one separate and predetermined policy is assigned to each of these possible combinations, as shown in the policy table below:

TABLE 3

| Predetermined Policy ID | Rights | | |
|---|---|---|---|
| | View | Print | Copy |
| PP1 | Yes | | |
| PP2 | | Yes | |
| PP3 | | Yes | Yes |
| PP4 | Yes | | Yes |
| PP5 | | | Yes |
| PP6 | Yes | Yes | |
| PP7 | Yes | Yes | Yes |
| PP8 | | | |

The number (L) of predetermined policies now is limited by the possible number of sets of rights. In the example above, there are eight (8) possible sets of rights, so the number (L) of the Predetermined Policies PP1 through PP8 is L=8. This results in a very small policy ID table that is much easier to manage.

As shown in FIG. 8, when User 1 (U1) acquires a right to view Document 1 (D1), since the right to view is associated with Predetermined Policy 1 (PP1), PP1 is added to U1 for D1, and D1 is also added to U1 in the UCA database 90, e.g., as the Table 4.1 shown below:

TABLE 4.1

| User ID | Document ID | Policy ID |
|---|---|---|
| U1 | D1 | PP1 |

When U1 acquires additional rights to additional documents, additional predetermined policies and documents can be added to the UCA database 90. For example, as also shown in FIG. 8, when U1 also acquires the rights to print and copy Document 2 (D2), since the rights to print and copy are associated with Predetermined Policy 3 (PP3), PP3 will be added to U1 for D2, and D2 is also added to U1 in the UCA database 90 wherein, e.g., Table 4.1 is updated to Table 4.2 as shown below:

TABLE 4.2

| User ID | Document ID | Policy ID |
|---|---|---|
| U1 | D1 | PP1 |
| U1 | D2 | PP3 |

As more users acquire rights to the DRM-protected documents, Table 4.2 can be further updated and stored in UCA database 90. For example, as shown in FIG. 9, when User 2 (U2) acquires the right to print D1, the rights to view and copy D2 and the rights to print and copy Document 3 (D3), then Predetermined Policies PP2 (for the print right), PP3 (for the print and copy rights) and PP4 (for the view and copy rights) are added to U2 for D1, D2 and D3 respectively, with the above table updated to Table 4.3 as below:

TABLE 4.3

| User ID | Document ID | Policy ID |
|---|---|---|
| U1 | D1 | PP1 |
| U1 | D2 | PP3 |
| U2 | D1 | PP2 |
| U2 | D2 | PP4 |
| U2 | D3 | PP3 |

Under the user centric approach according to the embodiments of the present invention, a user may access different document using the same policy. For example, as shown in FIG. 9 and Table 4.3, User 2 can use the same Predetermined Policy 3 (PP3) to access both Document 2 and Document 3.

The user centric approach according to the embodiments of the present invention is designed around the users, i.e., in the UCA database 90, the users will each have a list of documents assigned to them. This allows the flexibility of the DRM system to selectively revoke user access to certain documents, as now revoking a document will mean that the document will be removed from the list of documents assigned to the user. With this approach, the policy ID table (i.e., Table 3) is very small in size as the number of rows in the table for the predetermined policies will be equal to the number (L) of the predetermined policies used in the DRM system.

To achieve the goal, as shown in FIGS. 5 and 6, the UCA module 80 is added to a RMS server to provide the user centric approach in DRM policy enforcement. The UCA module provides a bridge that utilizes existing DRM capability and functions provided by the RMS server, while changes the DRM policy enforcement from a document centric approach to a user centric approach.

Figure 10:
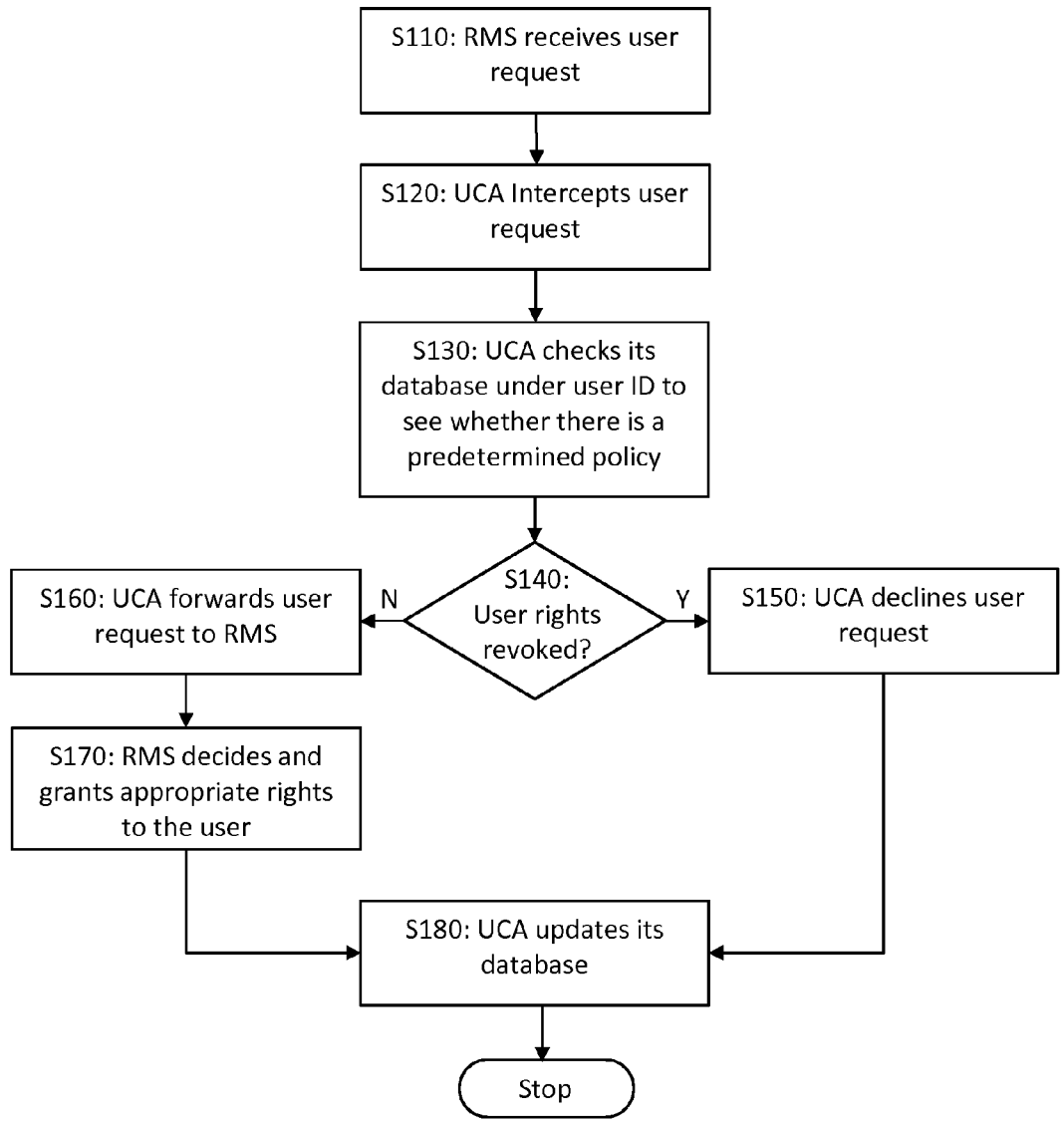
FIG. 10 is a flow chart diagram illustrating an exemplary process according to the embodiments of the present invention.

Referring to FIG. 10 (and in conjunction with FIG. 5), there is shown a flow chart diagram illustrating an exemplary process in accordance with the embodiments of the present invention. The process begins at Step S110, wherein a RMS server 30 receives a user request to access a DRM-protected document. This may happen when a user opens a DRM-protected document in a viewer such as the Adobe® Reader from a user computer 20, whereupon the viewer on the user computer 20 will communicate with the RMS server 30 via the network 40 for policy check.

The UCA module 80 at Step S120 intercepts the user request sent to RMS server 30 and at Step S130 first checks its own UCA database 90 to determine at Step S140 whether the user's right to the document is revoked or not. The check is easy as the UCA checks its database, e.g., Table 4.3 above, and see under user ID whether a predetermined policy for the document has been added next to the user ID. If the user right to the document is revoked (i.e., there is no predetermined policy added to the user for the document in, e.g., Table 4.3), then at Step S150 the UCA module 80 declines the user's access authorization to the document and the user cannot access the document, and the process ends. If the user right to the document is not revoked (i.e., there exists a predetermined policy added to the user for the document in the RCA database 90), then at Step S160 the UCA module 80 forwards the user request to the RMS unit 50, which at Step S170 further decides and grants appropriate access authorization to the user for accessing the DRM-protected document (for example, the RMA may allow the user to view and print but bot copy the document). At Step S180 the UCA may update the UCA database 90 as needed (e.g., if the user is granted certain rights to a document) in accordance with the user centric approach as described above in conjunction with FIGS. 8 and 9.

In this arrangement the UCA module 80 acts as a "gateway" of the RMS server. The UCA module is also used to revoke a user's access to a DRM-protected document. To revoke a document from a user's access, the UCA module 80 removes the document under the user's ID from the UCA database 90.

Figure 11:
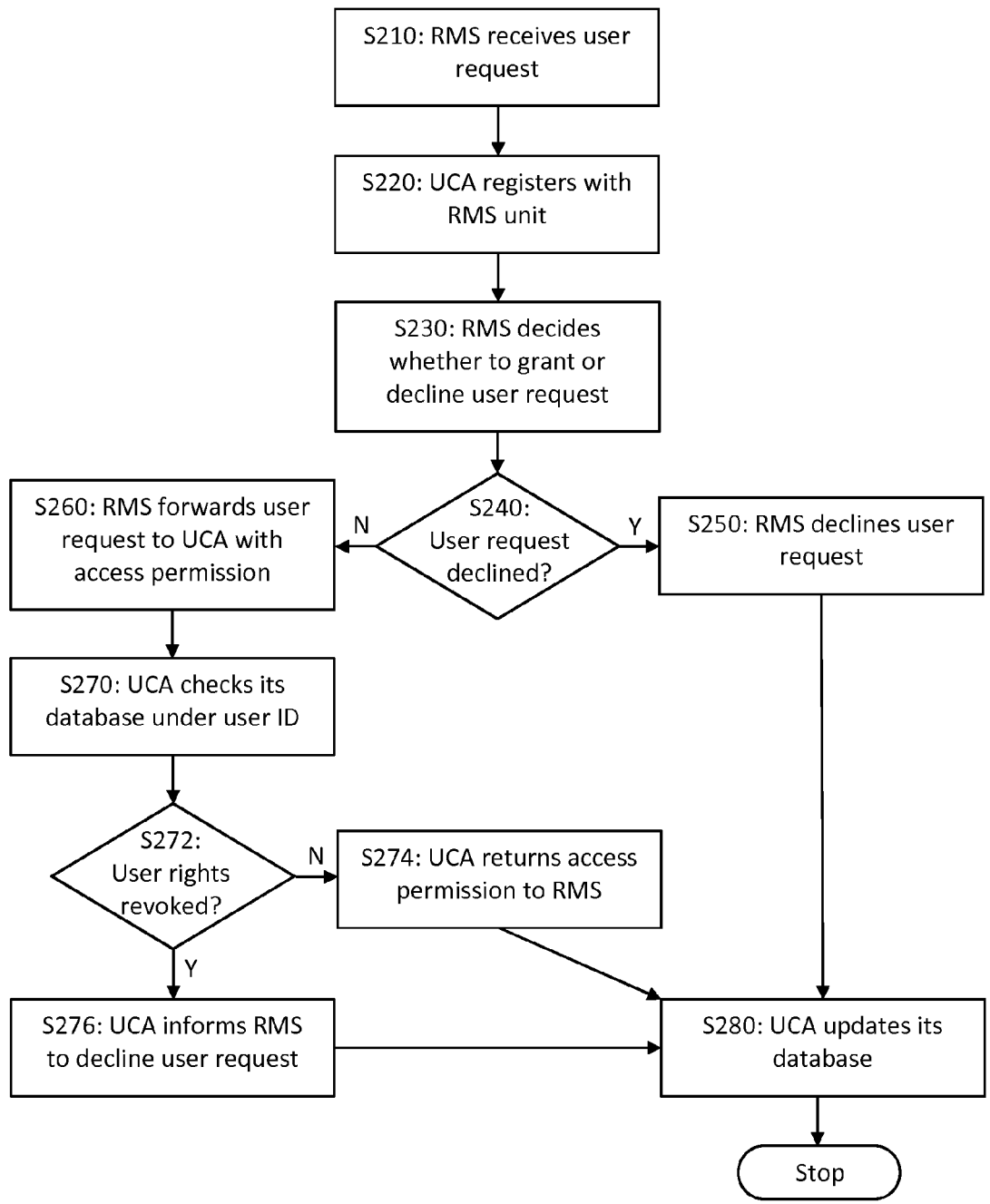
FIG. 11 is a flow chart diagram illustrating another exemplary process according to the embodiments of the present invention.

In case that the RMS server 30 does not allow interception of user requests, then the arrangement shown in FIG. 9 may be used, and the process flow is slightly different from the one described above. Referring to FIG. 11 (and in conjunction with FIG. 6), in this arrangement the RMS unit 50 acts as the gateway of the RMS server 30 and at Step 210 receives all the requests from the users. At Step S220 the UCA module 80 registers with the RMS unit 50 to delegate the authorization capability to the UCA module 80. At Step 230 the RMS unit 50 first carriers out the authorization in its normal manner to decide at Step S240 whether to grant or decline the user's request. If the user request is declined, then at Step S250 the UCA module 80 will update its database 90 to remove the declined document from the user's entry. If the user request is granted, then at Step S260 the RMS unit 50 sends the user request and access permission for the document to UCA module 80. The UCA module 80 then carries out its own checks at Step S270. If at Step S272 the result is that the user's rights to the document is not revoked, then at Step S274 the UCA module 80 returns the final access permissions to the RMS unit 50. However, if at Step S272 the result is that the user's rights to the document is revoked, then at Step S276 the UCA module 80 informs the RMS unit 50 not to authorize the user access to the document. Whatever the final result is, the UCA module 80 may update the UCA database 90 accordingly.

The UCA module 80 maintains its own database 90 as necessary to record under each user entry all the documents assigned to the user and the user access rights for the documents based on the predetermined policy added to the user for the respective document. The UCA module 80 may synchronizes its database 90 with the RMS database 70 whenever a document is assigned to a user and whenever permissions (policies) for assigned documents change. Any messages from or passed by the RMS unit 50 to the UCA module 80 may trigger update of the UCA database 90. Alternatively, the RMS database can be monitored by the UCA module 80 for necessary database synchronization.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method for managing users' digital rights to documents protected by digital rights management (DRM), comprising the steps of:

a rights management system (RMS) server maintaining a user centric adaptor (UCA) database which includes a plurality of entries, each entry containing a user identification (ID) which uniquely identifies one of a plurality of users of the RMS server and directly associating the user ID with one of a plurality of DRM-protected documents and one of a plurality of predetermined first type of policies of digital rights, wherein for a sub-plurality of two or more of the plurality of entries, each entry directly associates a different one of the plurality of users with a common one of the plurality of the DRM-protected documents;

the RMS server maintaining an RMS database which is separate from the UCA database, the RMS database including a first data structure having a plurality of entries, each entry associating one of the plurality of DRM-protected documents with one of a plurality of second type of policies of digital rights, and a second data structure that defines which user IDs have access rights under each one of the plurality of second type of policies;

the RMS server receiving a request from a user having a user ID for accessing a DRM-protected document, and in response thereto:

the RMS server executing a user centric adaptor (UCA) module to check in the UCA database to determine whether the UCA database contains an entry that directly associates the user ID with the DRM-protected document and one of the plurality of predetermined first type of policies of digital rights;

the RMS server executing an RMS unit to check the RMS database to determine whether the user ID has access right for the DRM-protected document, including to check the first data structure of the RMS database to determine the one of the second type of policies associated with the DRM-protected document, and then to check the second data structure of the RMS database to determine whether under that second type of policy the user ID has access right, wherein the executing of the RMS unit is separate from the executing of the UCA module; and the RMS server granting the user access to DRM-protected document when both the executing of the UCA module determines that the UCA database contains an entry that directly associates the user ID with the DRM-protected document and one of the plurality of first type of policies and the executing of the RMS unit determines that the user ID has access right for the DRM-protected document based on the second type of polices.

2. The method of claim 1, wherein the UCA database contains an entry that associates a user ID with a predetermined first type of policy and the DRM-protected document if the user has been granted digital rights covered by the predetermined first type of policy.

3. The method of claim 1, wherein multiple predetermined first type of policies may be associated to one DRM-protected document.

4. The method of claim 1, wherein the number of predetermined first type of policies is limited by the number of possible combinations of different digital rights.

5. The method of claim 1, further comprising a step of the UCA module registering with a rights management unit of the RMS server to delegate the authorization capability to the UCA module.

6. The method of claim 1, further comprising a step of the UCA module updating the UCA database according to the result of whether and what rights are granted to the user's request.

7. The method of claim 1, further comprising a step of the UCA module synchronizing the UCA database with the separate RMS database.

8. The method of claim 1, wherein for the sub-plurality of entries, each entry directly associates the different one of the plurality of user with the common one of the plurality of DRM-protected documents and a different one of the plurality of predetermined first type of policies.

9. The method of claim 1, wherein the step of the RMS server executing the UCA module is performed before the step of the RMS server executing the RMS unit.

10. The method of claim 1, wherein the step of the RMS server executing the RMS unit is performed before the step of the RMS server executing the UCA module.

11. A computer program product comprising a non-transitory computer usable medium having a computer readable code embodied therein for controlling a data processing apparatus, the computer readable program code configured to cause the data processing apparatus to execute a process for managing users' digital rights to documents protected by digital rights management (DRM), the process comprising the steps of:

a rights management system (RMS) server maintaining a user centric adaptor (UCA) database which includes a plurality of entries, each entry containing a user identification (ID) which uniquely identifies one of a plurality of users of the RMS server and directly associating the user ID with one of a plurality of DRM-protected documents and one of a plurality of predetermined first type of policies of digital rights, wherein for a sub-plurality of two or more of the plurality of entries, each entry directly associates a different one of the plurality of users with a common one of the plurality of the DRM-protected documents;

the RMS server maintaining an RMS database which is separate from the UCA database, the RMS database including a first data structure having a plurality of entries, each entry associating one of the plurality of DRM-protected documents with one of a plurality of second type of policies of digital rights, and a second data structure that defines which user IDs have access rights under each one of the plurality of second type of policies; the RMS server receiving a request from a user having a user ID for accessing a DRM-protected document, and in response thereto:

the RMS server executing a user centric adaptor (UCA) module to check in the UCA database to determine whether the UCA database contains an entry that directly associates the user ID with the DRM-protected document and one of the plurality of predetermined first type of policies of digital rights;

the RMS server executing an RMS unit to check the RMS database to determine whether the user ID has access right for the DRM-protected document, including to check the first data structure of the RMS database to determine the one of the second type of policies associated with the DRM-protected document, and then to check the second data structure of the RMS database to determine whether under that second type of policy the user ID has access right, wherein the executing of the RMS unit is separate from the executing of the UCA module; and the RMS server granting the user access to DRM-protected document when both the executing of the UCA module determines that the UCA database contains an entry that directly associates the user ID with the DRM-protected document and one of the plurality of first type of policies and the executing of the RMS unit determines that the user ID has access right for the DRM-protected document based on the second type of polices.

12. The computer program product of claim 11, wherein the UCA database contains an entry that associates a user ID with a predetermined first type of policy and the DRM-protected document if the user has been granted digital rights covered by the predetermined first type of policy.

13. The computer program product of claim 11, wherein multiple predetermined first type of policies may be associated to one DRM-protected document.

14. The computer program product of claim 11, wherein the number of predetermined first type of policies is limited by the number of possible combinations of different digital rights.

15. The computer program product of claim 11, wherein the process further comprises a step of the UCA module registering with a rights management unit of the RMS server to delegate the authorization capability to the UCA module.

16. The computer program product of claim 11, wherein the process further comprises a step of the UCA module updating the UCA database according to the result of whether and what rights are granted to the user's request.

17. The computer program product of claim 11, wherein the process further comprises a step of the UCA module synchronizing the UCA database with the separate RMS database.

18. The computer program product of claim 11, wherein for the sub-plurality of entries, each entry directly associates the different one of the plurality of user with the common one of the plurality of DRM-protected documents and a different one of the plurality of predetermined first type of policies.

19. The computer program product of claim 11, wherein the step of the RMS server executing the UCA module is performed before the step of the RMS server executing the RMS unit.

20. The computer program product of claim 11, wherein the step of the RMS server executing the RMS unit is performed before the step of the RMS server executing the UCA module.

* * * * *